United States Patent [19]
Kumagai et al.

[11] Patent Number: 4,479,156
[45] Date of Patent: Oct. 23, 1984

[54] MAGNETIC DISK RECORDER

[75] Inventors: Munehito Kumagai, Amagasaki; Shigehisa Suzuki, Itami, both of Japan

[73] Assignee: Mitsubishi Denki Kabushiki Kaisha, Tokyo, Japan

[21] Appl. No.: 375,090

[22] Filed: May 5, 1982

[30] Foreign Application Priority Data

May 11, 1981 [JP] Japan .................................. 56-70555

[51] Int. Cl.³ ........................ G11B 5/48; G11B 21/02
[52] U.S. Cl. .................................. 360/104; 360/103; 360/121
[58] Field of Search ............... 360/104, 109, 121, 122, 360/21, 97–99

[56] References Cited

U.S. PATENT DOCUMENTS

| | | | |
|---|---|---|---|
| 4,314,290 | 2/1982 | Ragle | 360/21 X |
| 4,321,634 | 3/1982 | Lehureau | 360/70 |
| 4,334,252 | 6/1982 | Toriu | 360/121 |
| 4,338,631 | 7/1982 | Ota | 360/21 X |

Primary Examiner—John H. Wolff
Attorney, Agent, or Firm—Wenderoth, Lind & Ponack

[57] ABSTRACT

A magnetic disk recorder which applies an azimuth recording system and which can use all of the tracks of a magnetic disk. In particular, a plurality of magnetic head chips, each of which is formed with a head gap having a predetermined azimuth angle, are respectively assembled into separate head sliders along with dummy heads, and the head sliders are driven by separate actuators.

2 Claims, 8 Drawing Figures

FIG. 1 III
PRIOR ART

MAGNETIC DISK RECORDER

BACKGROUND OF THE INVENTION

In recorders employing tapes, such as VTRs, the azimuth recording system in which head gaps are inclined with respect to the direction of tracks has been adopted in order to enhance the recording density.

In case this recording system is applied to a magnetic disk recorder with the intention of enhancing the recording density in the radial direction of a magnetic disk, there has been the problem that all the tracks of the magnetic disk cannot be used and that unrecorded tracks are left.

Let's consider a recording operation using a magnetic head in which the head gap of Channel 1 and that of Channel 2 have unequal angles (the so-called azimuth angles) with respect to the widthwise direction of the tracks of a magnetic disk. Letting $T_p$ denote the width of each track, it is favorable to set the internal distance between the head of Channel 1 and that of Channel 2 at a value three times greater than the track width $T_p$. First, the head of Channel 1 corresponds to the track of the outermost periphery of the magnetic disk, and the head of Channel 2 to the third track as reckoned from the outermost periphery, the track of the outermost periphery being excepted. Subsequently, the magnetic head is moved $2 \cdot T_p$ so that the head of Channel 1 may correspond to the second track as reckoned from the outermost periphery and that the head of Channel 2 may correspond to the fifth track. Furthermore, the magnetic head is successively moved inward at steps of $2 \cdot T_p$. Thus, most of the tracks are successively recorded.

However, the first track as reckoned from the outermost periphery and the first track as reckoned from the innermost periphery are left unrecorded.

An object of this invention is to provide a recording system which makes all of tracks usable when such an azimuth recording system is applied to a magnetic disk recorder.

SUMMARY OF THE INVENTION

This invention includes a magnetic disk recorder which applies an azimuth recording system which can use all of the tracks of a magnetic disk. In particular, a plurality of magnetic head chips, each of which is formed with a head gap having a predetermined azimuth angle, are respectively assembled into separate head sliders along with dummy heads, and the head sliders are driven by separate actuators.

BRIEF DESCRIPTION OF THE DRAWINGS

FIGS. 1(I) and 1(II) are perspective views showing prior art magnetic head chips of Channel 1 and Channel 2, respectively;

FIGS. 5(I) and 5(II) are plan views showing a pair of head sliders according to the present invention in which magnetic head chips of Channel 1 and Channel 2 are respectively assembled separately;

DESCRIPTION OF THE PREFERRED EMBODIMENT

Figure 2:
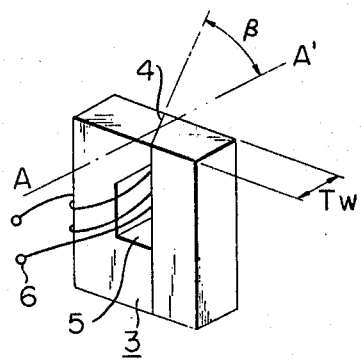
FIG. 2 is a perspective view of a prior art head slider.
Figure 2:
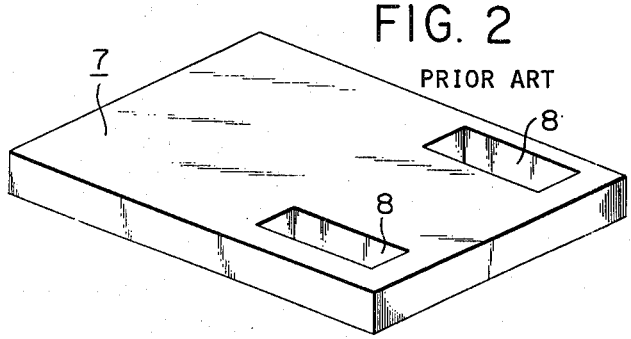
Figure 3:
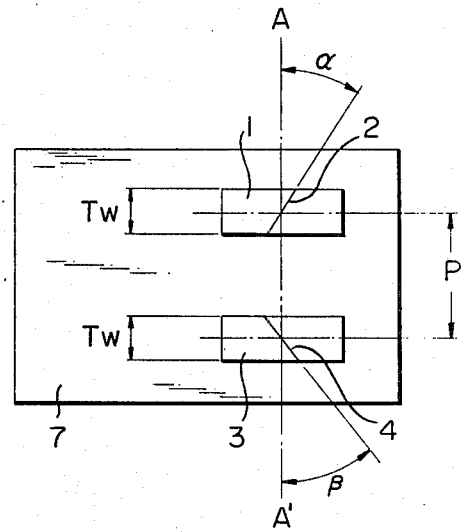
FIG. 3 is a plan view showing the state in which the magnetic head chips of Channel 1 and Channel 2 having unequal azimuth angles are assembled into the prior art single head slider.

First, the technique on which the present invention is grounded will be described with reference to FIGS. 1(I) and 1(II), FIG. 2, FIG. 3 and FIG. 4.

Figure 1:
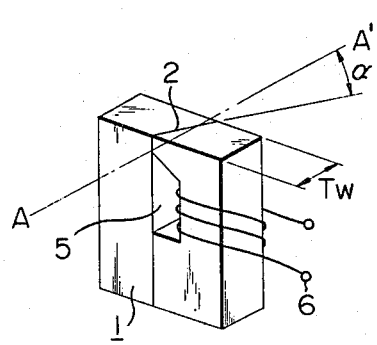

In FIGS. 1(I) and 1(II), numeral 1 designates a magnetic head chip of Channel 1 having a head gap 2 of an azimuth $\alpha$ which is defined to be positive in a clockwise direction with respect to a line A—A' which is perpendicular to a head chip plane, while numeral 3 designates a magnetic head chip of Channel 2 having a head gap 4 of an azimuth angle $\beta$ which is defined to be negative in a clockwise direction with respect to a line A—A' which is perpendicular to a head chip plane. Symbol Tw indicates the track width of each of the magnetic head chips 1 and 3, and numeral 5 indicates a window for inserting a coil 6. FIG. 2 is a perspective view of a head slider 7, which is formed with a pair of mounting windows 8 and 8 for inserting and holding the respective magnetic head chips 1 and 3. FIG. 3 is a plan view showing a magnetic head for azimuth recording in which both the magnetic head chips 1 and 3 are inserted into the mounting windows 8 and 8 of the head slider 7 and then bonded and fixed. FIG. 4 shows tracks recorded on the surface of a magnetic disk 9 by the above-noted magnetic head, and further shows the magnetized directions thereof. In FIG. 4, symbols a1 ~ an indicate the tracks recorded by the head gap 2 of the magnetic head chip 1, while symbols b1 ~ bn indicate the tracks recorded by the head gap 4 of the magnetic head chip 3. Each of the magnetic head chips 1 and 3 has the track width Tw., and these magnetic head chips are assembled at a center distance P. Letting $T_p$ denote the pitch of the tracks recorded on the magnetic disk 9, the center distance is set at $P = 3T_p$ in this example.

Figure 4:
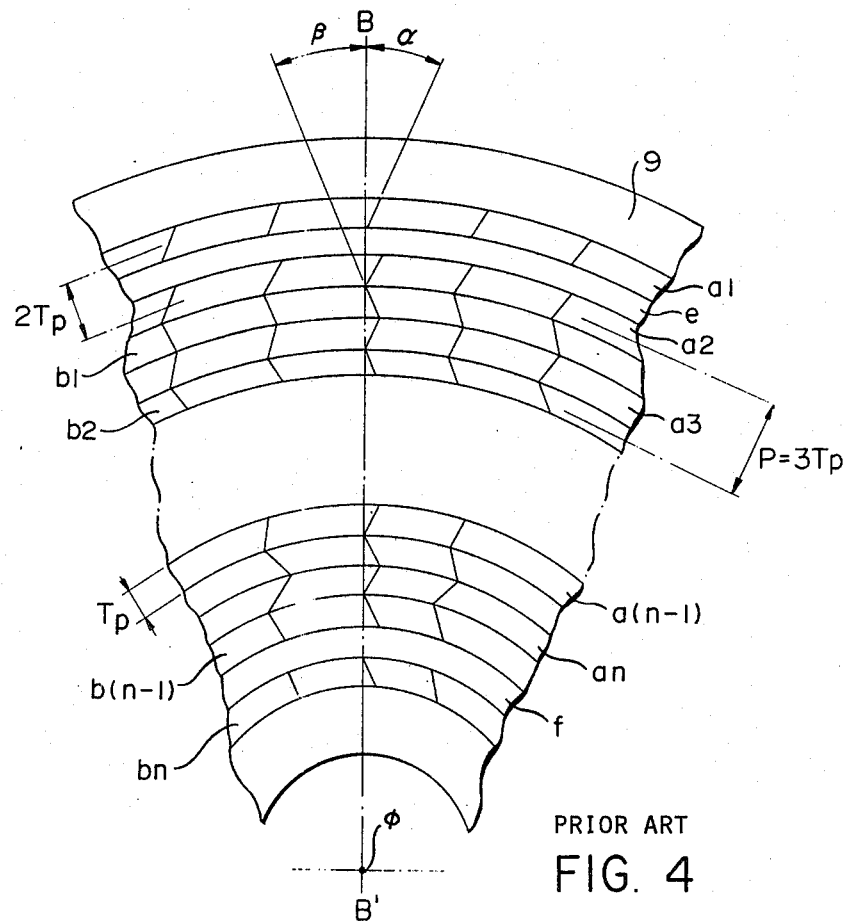
FIG. 4 is a pattern diagram showing tracks recorded on a magnetic disk by the prior art magnetic head shown in FIG. 3, and the magnetized directions thereof.

Referring to FIG. 4, the tracks a1 and b1 are first recorded by the respective head gaps 2 and 4 of the magnetic head chips 1 and 3. Subsequently, the head slider 7 is moved toward the inner periphery of the magnetic disk 9 by a step equal to $2 \cdot T_p$ along a line B—B' which passes through the rotational center $\phi$ of the magnetic disk 9, whereupon the tracks a2 and b2 are recorded by the respective head gaps 2 and 4. Thereafter, while the head slider 7 is being moved toward the inner periphery by steps of $2 \cdot T_p$ in succession, the tracks are recorded so that all the tracks may be finally recorded.

The prior-art azimuth-recording magnetic head described above, however, has the disadvantage that unrecorded tracks e and f with one track belonging to each of the innermost periphery and outermost periphery of the magnetic disk are left as illustrated in FIG. 4.

This invention has been made to obviate such a drawback, and is intended to provide an azimuth-recording magnetic head which can record tracks on a magnetic disk surface without any waste.

Figure 5:
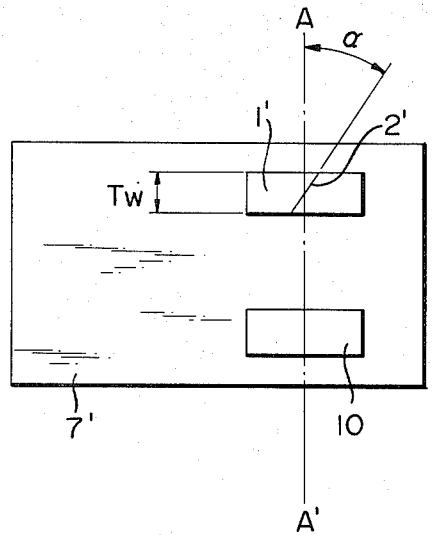
Figure 5:
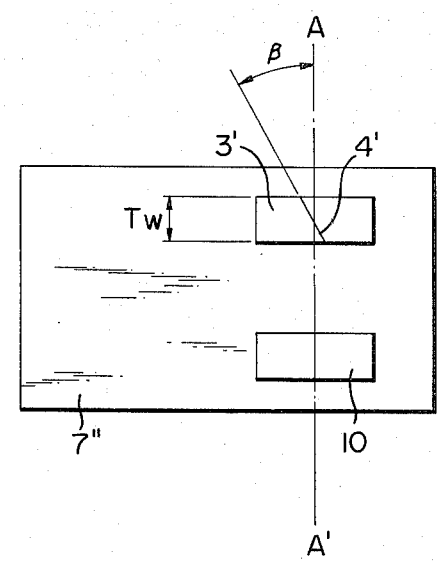
Figure 6:
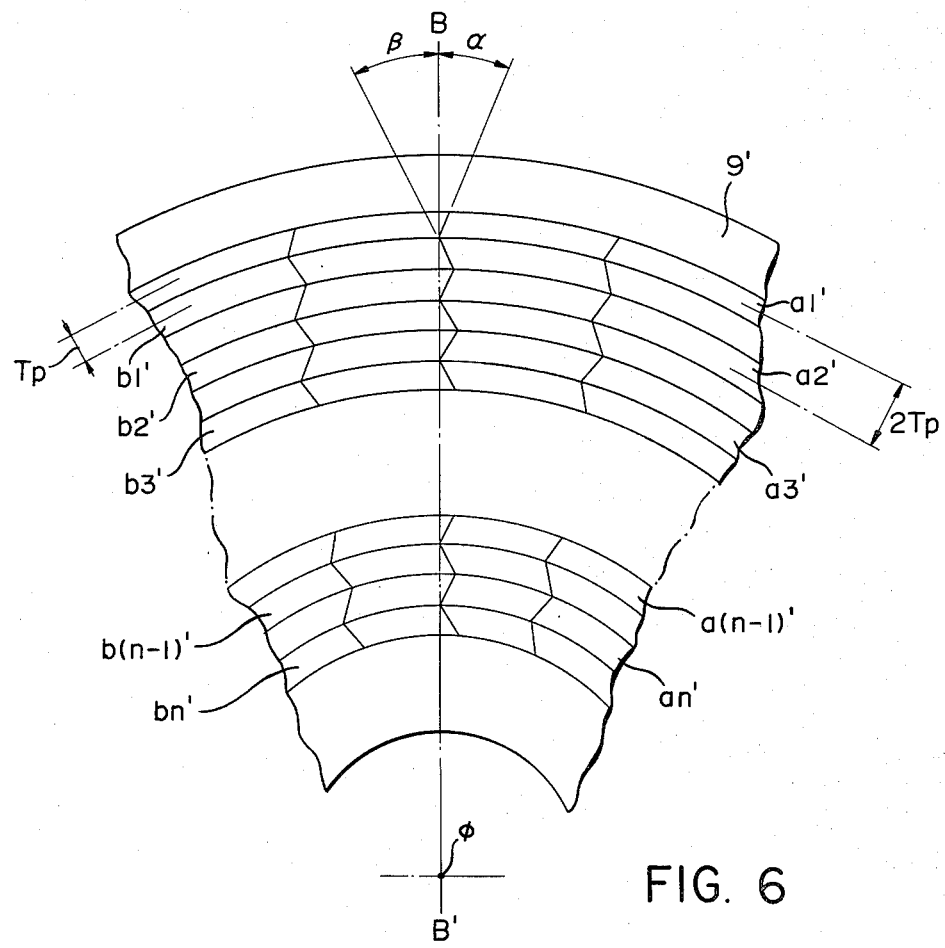
FIG. 6 is a pattern diagram showing tracks recorded on a magnetic disk by the magnetic head according to the present invention, and the magnetized directions thereof.

FIGS. 5(I) and 5(II) show an embodiment of this invention, in which symbols 1' and 3' indicate magnetic head chips respectively having head gaps 2' and 4' of azimuth angles $\alpha$ and $\beta$, symbols 7' and 7" denote head sliders which are separate from each other, and numeral 10 denotes a dummy head. FIG. 6 is a pattern diagram which shows the tracks which are recorded on the surface of a magnetic disk 9' by the magnetic head of this invention, and further show the magnetized directions thereof. This invention is characterized in that, as shown in FIGS. 5(I) and 5(II), the magnetic head chip 1' of Channel 1 having a head gap 2' with an azimuth angle α which is positive in a clockwise direction with respect to a line A—A' which is perpendicular to the plane of the head chip and the magnetic head chip 3' of Channel 2 having a head gap 4' which an azimuth angle β which is negative in a clockwise direction with respect to a line A—A' which is perpendicular to the plane of the head chip. The magnetic head chips are respectively assembled into the separate head sliders 7' and 7", and these head sliders are respectively mounted on separate actuators (not shown).

FIG. 6 shows the tracks recorded on the magnetic disk 9' by the magnetic head according to this invention, as well as the magnetized directions thereof, wherein a1' ~ an' indicate the tracks recorded by the head gap 2' of the magnetic head chip 1', and b1' ~ bn' indicate the tracks recorded by the head gap 4' of the magnetic head chip 3'. Each of the magnetic head chips 1' and 3' has a track width Tw. Letting $T_p$ denote the pitch of the tracks recorded on the magnetic disk 9', the actuators on which the head sliders 7' and 7" are individually mounted are initially set so that the other head chip 3' may be moved closer to the inner periphery than one head chip 1' by the track pitch $t_p$.

Therefore, according to the azimuth-recording magnetic head of this invention, the tracks a1' and b1' are first recorded by the respective head gaps 2' and 4' of the magnetic head chips 1' and 3'. Subsequently, the head sliders 7' and 7" are moved toward the inner periphery of the magnetic disk 9' by steps of $2 \cdot T_p$ by the respective actuators along a line B—B' which passes through the rotational center φ of the magnetic disk 9', whereupon the tracks a2' and b2' are respectively recorded by the head gaps 2' and 4'. Thereafter, while the head sliders are being moved toward the inner periphery by the steps of $2 \cdot T_p$ in succession, the tracks are recorded on the magnetic disk 9'. This invention has the excellent effect that the unrecorded tracks e and f with one track belonging to each of the outermost periphery and the innermost periphery of the magnetic disk as in the foregoing prior art are not left unused.

What is claimed is:

1. A magnetic disk recorder comprising: a plurality of magnetic head chips, each of which is formed with a head gap having a predetermined azimuth angle; at least two separate head sliders, each of which having one of said plurality of magnetic head chips assembled thereon; and at least two separate actuators, each of which actuates a respective one of said head sliders by associated connecting means, said azimuth angle of said head gap of one of said plurality of magnetic head chips is defined to be positive in a clockwise direction with respect to a radial line extending from the center of said magnetic disk and wherein said azimuth angle of said head gap of another of said magnetic head chips is defined to be negative in a clockwise direction with respect to said radial line, said magnetic head chips having said positive azimuth angle is assembled on one of said head sliders, while said magnetic head chip having said negative angle is assembled on another of said head sliders, wherein two of said magnetic head chips are arranged at a distance which is equal to a track pitch $T_p$, and said head chips are moved by said actuators at $2 \cdot T_p$ steps in succession.

2. A magnetic disk recorder according to claim 1, further comprising at least two dummy heads, each of which is assembled in a respective one of said head sliders along with said magnetic head chips.

* * * * *